Figure 1:
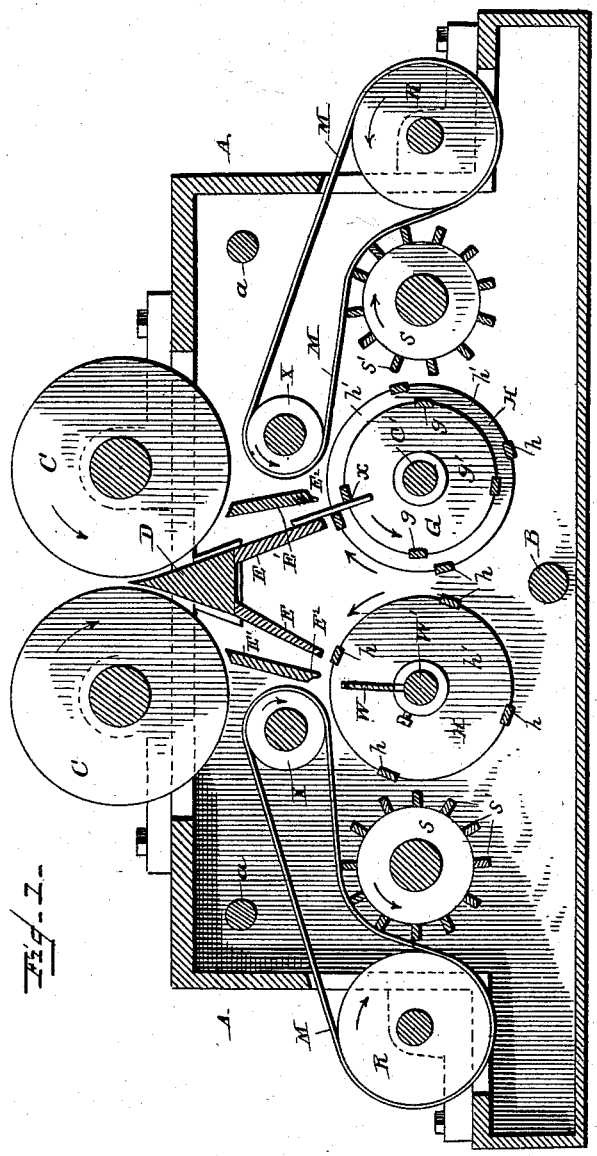

(No Model.) 2 Sheets—Sheet 1.
J. J. GREEN.
MACHINE FOR TREATING HEMP, RAMIE, &c.

No. 388,664. Patented Aug. 28, 1888.

WITNESSES.
Edwin T. Yewell.
Ewell A. Dick

INVENTOR.
Joshua J. Green.
by Marcellus Bailey.
his Attorney.

(No Model.) 2 Sheets—Sheet 2.

J. J. GREEN.
MACHINE FOR TREATING HEMP, RAMIE, &c.

No. 388,664. Patented Aug. 28, 1888.

WITNESSES-
Edwin T. Yewell,
Ewell A. Dick

INVENTOR-
Joshua J. Green
by Macalbre Steele
her Attorney

UNITED STATES PATENT OFFICE.

JOSHUA J. GREEN, OF NEW YORK, N. Y.

MACHINE FOR TREATING HEMP, RAMIE, &c.

SPECIFICATION forming part of Letters Patent No. 388,664, dated August 28, 1888.

Application filed June 16, 1888. Serial No. 277,387. (No model.)

*To all whom it may concern:*

Be it known that I, JOSHUA J. GREEN, of the city, county, and State of New York, have invented certain new and useful Improvements in Machines for Treating Hemp, Ramie, &c., of which the following is a specification.

My invention has reference to mechanism for separating and removing the pith of hemp, ramie, and other fibrous stalks from its fibrous integument. In order to put the stalk in condition for this operation it has heretofore been customary to preliminarily split the stalk in two longitudinally, so as to expose its comparatively brittle pithy interior. In my machine the split stalk is conducted between guide-plates from the feed-rolls to the point where its pithy interior is to be acted on, at which point the stalk is caused to make a sharp bend around a breaker (which may be the end of one of the guide-plates) for the purpose of causing the pith to break and strip from the fibrous integument as the stalk is fed or carried along, and to project into the path of a rapidly-revolving beater, by which it is broken off and removed. The front end of the stalk is carried along to a tension device consisting of an apron and a tension-roll, which, preferably, is toothed, so as to serve also as a scraper-roll, said roll and apron moving in unison at a much faster speed than the feed-rolls to exercise upon the stalk the pulling strain requisite to bend it taut around the breaker. The form of beater which I now prefer on the whole, and which is of my own devising, is one comprising a revolving beater proper provided on its periphery with longitudinal beater-bars, through the openings between which access can be freely had to the interior of the beater, in combination with a stationary blade placed within the beater with its outer longitudinal edge parallel with and in close proximity to the inner faces of the beater-bars. This device is so placed with reference to the point at which the stalk makes its bend that the pith as it strips from the fibrous integument will project into the beater between its bars and the stationary blade within, and thus will be nipped and broken off between these two parts. The beater itself revolves in the direction of the travel or feed movement of the stalk, one advantage of this being that any hanging or straying threads of fiber will be restored to the body of the fibrous ribbon, thus preventing what would otherwise prove to be a considerable loss in working any but very green stalks.

The nature of my invention and the manner in which the same is or may be carried into effect will be understood by reference to the accompanying drawings, in which—

Figure 2:
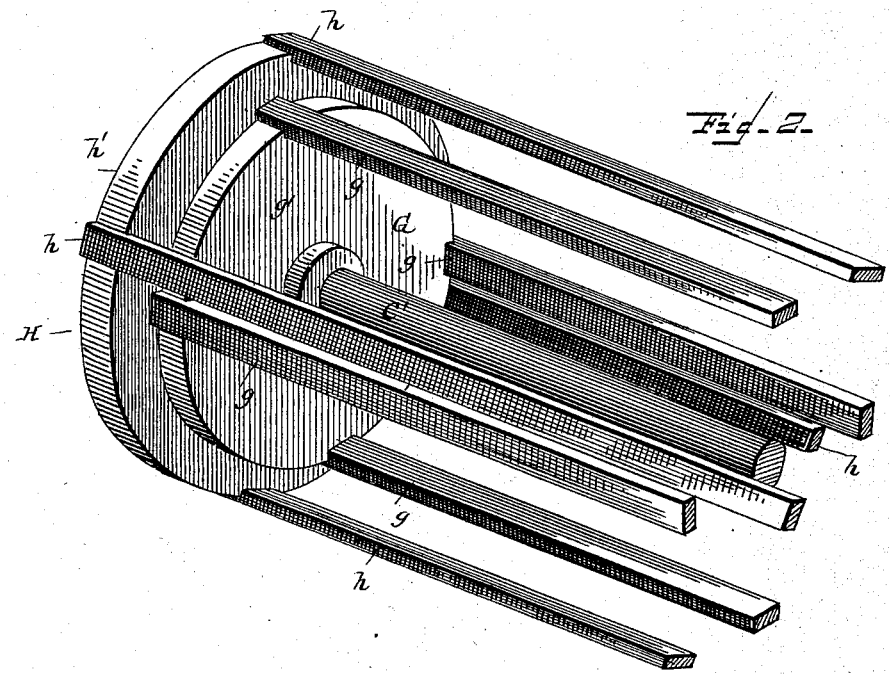
Figure 3:
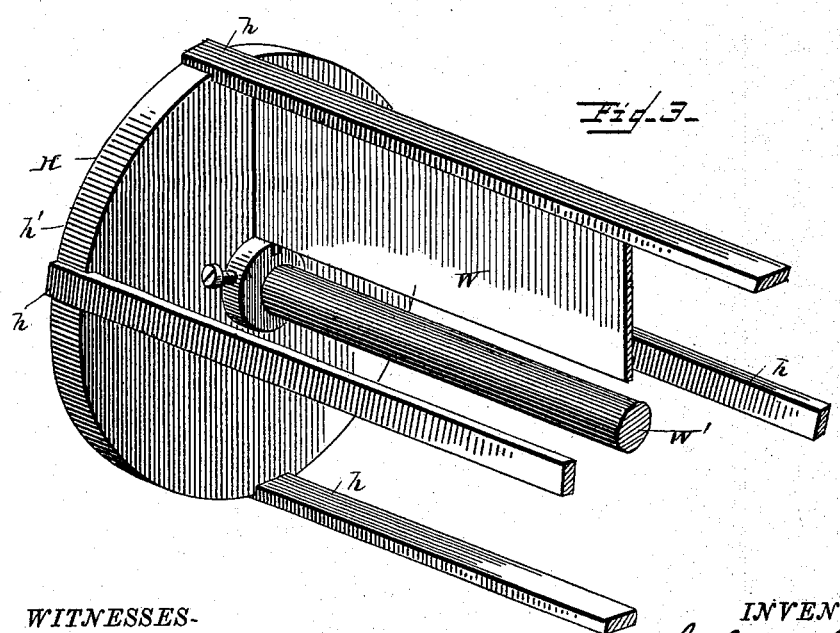

Figure 1 is a longitudinal vertical central section of a machine embodying my invention. Fig. 2 is a perspective view of a portion of the beater represented in the right-hand half of the machine in Fig. 1. Fig. 3 is a perspective view of a portion of the beater represented in the left-hand half of the machine in Fig. 1.

A is a supporting-frame of any suitable construction, the sides of which are held together by the rods or cross-bars $a$. The power-driven parts of the machine derive their movement from a driving-shaft, B, through the intermediary of gearing, which I have not deemed it necessary to represent. The direction of movement of the various instrumentalities is indicated by the arrows. Their proportions and the relative speed at which they move will be mentioned in the course of this specification.

C C are the feed-rolls, (say six inches in diameter and about fifty inches long, this being the usual width of the machine,) power-driven from shaft B. D is the triangular splitting-knife between said rolls, by which each stalk as it is fed along is split in two lengthwise, the two halves passing down on opposite sides of the knife to the guides E E', between which they pass. The machine is a double machine, one half operating upon one half of the stalk and the other half operating upon the other half of the stalk, and the two divisions of the machine are the same in general construction and arrangement, the only difference between them being in the specific construction of the beaters employed in the respective divisions, which will be hereinafter more particularly pointed out. A description of one half or division of the machine will therefore answer for both.

$E^2$ is the breaker, around which the stalk is abruptly bent. In this instance, for convenience' sake, it consists of the lower end of the guide-plate E', although it may be a separate bar, if desired. Beyond the breaker is the power-driven tension-roll S, of about five inches in diameter, armed with longitudinal parallel and evenly spaced steel blades S' to enable it to act also as a scraper-roll, and in connection with this roll is run an apron, M, which passes from an idler-roll, X, (of about two inches diameter,) over the top of the scraper and tension-roll S, thence down under and around a power-driven roll, R, (of about four inches diameter,) back to the idler-roll X. The idler-roll is set as close as possible to the breaker and to the feed-rolls, there being just about space enough for the idler between these two points. The roll S revolves at about three times the rate of speed at which the stalk is fed into the machine by the feed-rolls C C', and the apron M moves in unison with the roll S. The beater is opposite the lower ends of the guides, and is so placed that its nearest point of approach to the stalk is at the point where the latter emerges from or projects downward from between them.

The beater shown in the right-hand half of the machine is a compound beater, G H. Beater H consists of equally-spaced longitudinal bars $h\ h$, parallel to one another and secured to the periphery of end disks $h'\ h'$, which have a diameter of about five inches and are mounted to revolve on shaft G'. Beater H, by gearing, is rotated at a rapid rate of speed in the direction of the travel of the stalk through the machine. Beater G, like beater H, is made up essentially of end disks $g'\ g'$ (of about four inches diameter) and bars $g\ g$. It is placed within beater H, and its end disks are fixed to the shaft G', which is power-driven and revolves in a direction opposite to that in which beater H moves. The two oppositely-revolving beaters which make up the compound beater revolve at equal speeds, and they are so placed relatively to each other and to the guides and breaker that the corresponding bars of the two beaters will meet and pass one another at the point where the pith as it strips from the stalk will project into the path of the beater, as indicated in Fig. 1, where $x$ represents the end of the pith projecting into the path of the compound beater. The dimensions of the several parts of the compound beater may vary. In practice excellent results can be obtained with beater-bars one inch wide and one-quarter inch thick, the two beaters being so proportioned that when the inner and outer bars pass one another there will be a space of about one-quarter of an inch between the inner face of the outer bar and the outer face of the inner bar.

I make no claim in this specification to the compound beater G H *per se*, the same being, among other things, the subject of my application for Letters Patent filed May 23, 1888, bearing Serial No. 274,770.

The compound beater shown in the left-hand division of the machine in Fig. 1 resembles the one already described in so far as the outer beater, H, is concerned. This beater is constructed, arranged, and driven in the same way as the like-lettered one in the right-hand part of the machine. In lieu, however, of an inner oppositely-revolving beater, G, I make use of a stationary longitudinal blade, W, supported by a stationary shaft or axle, W'. Its outer edge is separated by about a quarter of an inch from the bars $h$ of the beater when the latter pass over it, and it is so placed that it is just beyond (relatively to the travel of the stalk through the machine) the path $x$, in which the pith moves forward as it strips from the stalk. This last-described form of compound beater is the one which I on the whole prefer at present as being most efficient in action and simple and least liable to get out of adjustment and working order, the stationary plate W furnishing at all times a fixed and invariable nipper-jaw to co-operate with the series of moving nipper-jaws $h$.

When the machine is in operation, the split stalk is regularly fed between the guides to the rapidly-revolving beater. When the front or butt end of the stalk is presented to the beater and is by it nipped and broken as to the pith portion, the bars $h$ will, by continuously and rapidly striking this part of the stalk, bend it abruptly around the breaker $E^2$ and direct it toward the roll S. As soon as the front end of the stalk reaches this roll, it will thereby be lifted and carried forward until it is caught between said roll and the apron M, and as these parts move much more rapidly than the feed the stalk will be subjected to a pulling strain which will have the effect of bending it sharply under tension around the breaker $E^2$. The effect is that the brittle pith strips from the fibrous portion of the stalk at that point and projects straight forward into the path of the beater, which nips it off and removes it, the fibrous ribbon freed from its woody interior passing forward to and between the roll S and apron M. The roll S also acts to remove from the butt or front end of the stalk the small portion of pith which may not have been removed from that particular portion of the stalk by the beater.

Having described my improvements and the manner in which the same is or may be carried into effect, I remark in conclusion that of course either one of the two forms of beaters hereinbefore described can be used in both of the two divisions or halves of the machine. I also remark that I do not restrict myself to the specific construction either of the guides between which the stalk is conveyed to the beater or of the breaker around which the stalk is bent, or of the beater, for manifestly the same can be varied considerably without materially departing from my invention; but

What I claim herein as new, and desire to secure by Letters Patent, is—

1. The combination of the guides, the breaker, the beater, the tension-roll, and the apron, substantially as and for the purposes hereinbefore set forth.

2. The combination of the feed-rolls, the splitting-knife, the guides, the breaker, the beater, the tension-roll, and the apron, substantially as and for the purposes hereinbefore set forth.

3. The compound beater consisting of the rotating beater proper, H, with bars $h$, and the fixed or stationary blade W within the rotating beater proper, with its acting edge arranged with reference to the bars $h$, substantially as and for the purposes hereinbefore set forth.

4. The compound beater consisting of the rotating beater proper, H, with bars $h$, and the stationary blade W within the said beater proper, in combination with the guides, the breaker, and the tension devices, substantially as and for the purposes hereinbefore set forth.

In testimony whereof I have hereunto set my hand this 12th day of June, A. D. 1888.

JOSHUA J. GREEN.

Witnesses:
  EWELL A. DICK,
  M. A. CUSTIS.